United States Patent
Kvernvik et al.

(10) Patent No.: US 10,880,181 B2
(45) Date of Patent: Dec. 29, 2020

(54) METHODS AND APPARATUS FOR ANALYSING PERFORMANCE OF A TELECOMMUNICATIONS NETWORK

(71) Applicant: Telefonaktiebolaget LM Ericsson (publ), Stockholm (SE)

(72) Inventors: Tor Kvernvik, Täby (SE); Johan Haraldson, Stockholm (SE); Yu Wang, Solna (SE); Jaeseong Jeong, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 16/474,989

(22) PCT Filed: Jan. 17, 2017

(86) PCT No.: PCT/EP2017/050885
§ 371 (c)(1),
(2) Date: Jun. 28, 2019

(87) PCT Pub. No.: WO2018/133924
PCT Pub. Date: Jul. 26, 2018

(65) Prior Publication Data
US 2019/0334784 A1    Oct. 31, 2019

(51) Int. Cl.
*H04L 12/28* (2006.01)
*H04L 12/24* (2006.01)
*H04W 24/08* (2009.01)

(52) U.S. Cl.
CPC ............ *H04L 41/142* (2013.01); *H04L 41/16* (2013.01); *H04W 24/08* (2013.01)

(58) Field of Classification Search
CPC ....... H04L 12/24; H04L 41/16; H04L 41/142; H04W 24/08
See application file for complete search history.

(56) References Cited

U.S. PATENT DOCUMENTS

| 2009/0047977 A1* | 2/2009 | Malomsoky .......... H04W 24/08 455/456.1 |
| 2010/0027432 A1 | 2/2010 | Gopalan et al. |

(Continued)

FOREIGN PATENT DOCUMENTS

EP    2882135 A1    6/2015

OTHER PUBLICATIONS

Janakiraman, Vijay Manikandan, et al., "Anomaly Detection in Aviation Data using Extreme Learning Machines," 2016 International Joint Conference on Neural Networks (IJCNN), Vancouver, BC, IEEE, 2016, pp. 1993-2000.

(Continued)

*Primary Examiner* — Elisabeth Benoit Magloire
(74) *Attorney, Agent, or Firm* — Withrow & Terranova, PLLC

(57) ABSTRACT

A method for analysing performance of a telecommunications network is disclosed. The method comprises assembling values observed for a network performance parameter over a time window and constructing a time series by associating each performance parameter value with a representation of a time at which the value was observed. The method further comprises encoding the time series to generate a compressed representation of the time series, decoding the compressed representation of the time series to reconstruct the time series, calculating a reconstruction error between the time series and the reconstructed time series, and analysing the reconstruction error to determine if the assembled performance parameter values indicate an anomalous behaviour during the time window. Also disclosed are an apparatus and a computer program product configured to conduct methods for analysing performance of a telecommunications network.

20 Claims, 11 Drawing Sheets

(56) References Cited

U.S. PATENT DOCUMENTS

| | | | | |
|---|---|---|---|---|
| 2014/0023253 | A1* | 1/2014 | Hesthaven | G01R 33/5619 |
| | | | | 382/131 |
| 2014/0047106 | A1 | 2/2014 | Leung et al. | |
| 2016/0050653 | A1* | 2/2016 | Rastogi | H04W 72/0486 |
| | | | | 455/453 |
| 2016/0065419 | A1* | 3/2016 | Szilagyi | G06F 11/3006 |
| | | | | 709/224 |
| 2017/0026250 | A1* | 1/2017 | Hu | H04L 41/142 |
| 2017/0316048 | A1* | 11/2017 | Papageorgiou | H04L 67/2842 |

OTHER PUBLICATIONS

Sölch, Maximilian, "Detecting anomalies in robot time series data using stochastic recurrent networks," Masters Thesis, Department of Mathematics, School of Engineering Sciences, Royal Institute of Technology KTH Stockholm, Munchen, Dec. 1, 2015, 76 pages.

International Search Report and Written Opinion for International Patent Application No. PCT/EP2017/050885, dated Jul. 25, 2017, 11 pages.

* cited by examiner

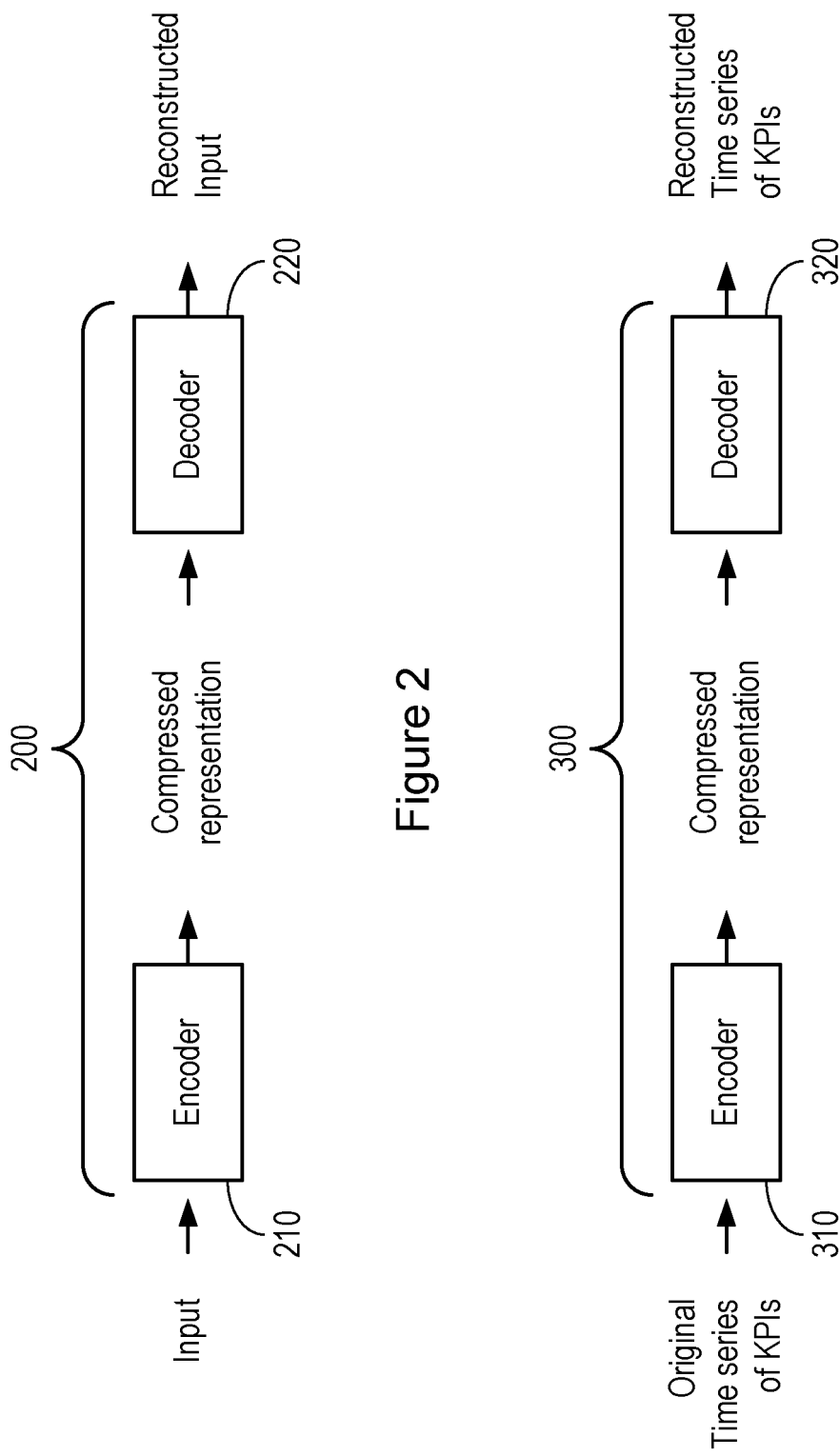

METHODS AND APPARATUS FOR ANALYSING PERFORMANCE OF A TELECOMMUNICATIONS NETWORK

This application is a 35 U.S.C. § 371 national phase filing of International Application No. PCT/EP2017/050885, filed Jan. 17, 2017, the disclosure of which is incorporated herein by reference in its entirety.

TECHNICAL FIELD

The present disclosure relates to a method for analysing performance of a telecommunications network. The present disclosure also relates to apparatus for analysing performance of a telecommunications network and to a computer program and a computer program product configured, when run on a computer to carry out methods for analysing performance of a telecommunications network.

BACKGROUND

Telecommunications networks generate a vast amount of status information reflecting the flow of traffic through the networks, network performance, and service levels experienced by users of the networks. Reviewing this information to determine which information indicates a problem or sub-optimal performance, and to identify which information may be acted upon to improve performance, is a highly demanding task for service engineers working at Network Operating Centres. Anomaly detection methods may be used to reduce the complexity of the information to be reviewed by identifying an instance of a network behaving differently from an established normal behaviour pattern.

A basic anomaly detection method involves comparing Key Performance Indicators (KPIs) to thresholds which have been set to represent the limit of normal behaviour. KPIs may be selected to represent the most important performance parameters within the network from the point of view of customer satisfaction or network performance. A KPI value outside a threshold would indicate anomalous behaviour to be investigated. Although relatively simple in principle, the use of thresholds to analyse KPIs requires considerable domain knowledge for the initial setting and subsequent updating of the thresholds, and thus can only be managed by an experienced network operator. In addition, the static thresholds cannot take account of normal variations in network traffic and performance associated with day and night time operation, weekdays and weekends etc., referred to in the following specification as seasonality. Abnormal combinations of KPI values also cannot be detected by a simple comparison of individual KPIs to thresholds. An abnormal combination of KPIs may include for example two KPIs which are normally correlated but for which correlation is lost.

More sophisticated statistical approaches may be able to detect abnormal KPI combinations. Such methods may additionally use decomposition to address seasonality in the variation of KPIs, and may therefore be able to handle such periodic variations in normal network performance. However, delicate manual tuning is required to set up the treatment of seasonal variations, again requiring management from an experienced network operator. In addition, more complex seasonality cannot be captured by such statistical methods. Complex seasonality may include for example a football game or other sporting or entertainment event that occurs regularly at a specific location but at varying times and with different intensity.

SUMMARY

It is an aim of the present disclosure to provide a method and apparatus which facilitate the detection of anomalous behaviour in a telecommunications network.

According to a first aspect of the present disclosure, there is provided a method for analysing performance of a telecommunications network. The method comprises assembling values observed for a network performance parameter over a time window, constructing a time series by associating each performance parameter value with a representation of a time at which the value was observed and encoding the time series to generate a compressed representation of the time series. The method further comprises decoding the compressed representation of the time series to reconstruct the time series, calculating a reconstruction error between the time series and the reconstructed time series, and analysing the reconstruction error to determine if the assembled performance parameter values indicate an anomalous behaviour during the time window.

According to examples of the present disclosure, the time window may be defined as a frequency of observation of the performance parameter multiplied by a number of observation windows.

According to examples of the present disclosure, associating a performance parameter value with a representation of a time at which the value was observed may comprise establishing a time at which the performance parameter value was observed, converting the time into a representation of the time in which the representation of the time follows consecutively from a representation of a time for an immediately preceding observed value, and associating the representation of the time with the performance parameter value.

According to examples of the present disclosure, converting the time into a representation of the time in which the representation of the time follows consecutively from a representation of a time for an immediately preceding observed value may comprise mapping the time to a location on a unit circle, and representing the time as coordinates of the mapped location on the unit circle. The coordinates may be expressed in any appropriate coordinate system.

According to examples of the present disclosure, the representation of the time may be normalised.

According to examples of the present disclosure, the time at which a value was observed may comprise a time of day, which may for example be expressed in a 24 hour format.

According to examples of the present disclosure, the time at which a value was observed may comprise a day of the week.

According to further examples of the present disclosure, the time at which a value was observed may comprise a week of the year and/or a month of the year.

According to examples of the present disclosure, the time at which a value was observed may comprise both a time of day and a day of the week, and the representation of the time at which the value was observed may comprise a first element representing the time of day and a second element representing the day of the week. According to examples of the present disclosure, each element may comprise two features, the two features comprising coordinates of a mapped location on a unit circle. The coordinates may be expressed in any appropriate coordinate system.

According to examples of the present disclosure, constructing a time series by associating each performance parameter value with a representation of a time at which the value was observed may comprise constructing a vector comprising the value and the associated time representation.

According to examples of the present disclosure, constructing a time series by associating each performance parameter value with a representation of a time at which the value was observed may further comprise constructing a matrix comprising vectors for each of the performance parameter values observed within the time window.

According to examples of the present disclosure, the performance parameter values may be normalised, for example to have a value between 0 and 1.

According to examples of the present disclosure, the steps of encoding the time series to generate a compressed representation of the time series, decoding the compressed representation of the time series to reconstruct the time series, and calculating a reconstruction error between the time series and the reconstructed time series may be performed by an Artificial Neural Network (ANN)

According to examples of the present disclosure, the steps of encoding the time series to generate a compressed representation of the time series, decoding the compressed representation of the time series to reconstruct the time series, and calculating a reconstruction error between the time series and the reconstructed time series may be performed by an autoencoder, which may comprise an ANN.

According to examples of the present disclosure, calculating a reconstruction error between the time series and the reconstructed time series may comprise calculating a difference between an observed value and a reconstructed value for each value of the performance parameter in the time series, and calculating a mean value of the differences over the time window.

According to examples of the present disclosure, calculating a reconstruction error between the time series and the reconstructed time series may further comprise generating an anomaly metric by normalising the calculated mean value.

According to examples of the present disclosure, the calculated mean value may be normalised to be between 0 and 1.

According to examples of the present disclosure, calculating a reconstruction error between the time series and the reconstructed time series may further comprise calculating a difference between an original value and a reconstructed value for each value of the representation of a time in the time series, and calculating a mean value of the differences over the time window.

According to examples of the present disclosure, the method may further comprise, during a learning phase, repeating the steps of encoding the time series to generate a compressed representation of the time series, decoding the compressed representation of the time series to reconstruct the time series, and calculating a reconstruction error between the time series and the reconstructed time series, and, between each repetition of the steps, refining parameters used in the decoding step to minimise the calculated reconstruction error.

According to examples of the present disclosure, the parameters refined may be weighting factors.

According to examples of the present disclosure, the method may further comprise repeating the steps of encoding the time series to generate a compressed representation of the time series, decoding the compressed representation of the time series to reconstruct the time series, and calculating a reconstruction error between the time series and the reconstructed time series until a threshold error magnitude is reached.

According to examples of the present disclosure, the method may alternatively repeat the steps for a configured maximum number of repetitions, or may cease repetitions after the maximum number, even if the threshold error magnitude has not been reached.

According to examples of the present disclosure, the method may further comprise establishing a profile of the reconstruction error representing normal behaviour of the performance parameter.

According to examples of the present disclosure, establishing a profile of the reconstruction error representing normal behaviour of the performance parameter may comprise conducting a statistical analysis of the reconstruction error and defining a threshold distance from a mean value of the reconstruction error, the threshold distance delineating the profile representing normal behaviour of the performance parameter.

According to examples of the present disclosure, the threshold distance may for example be defined with reference to the standard deviation of a distribution of the reconstruction error. For example the threshold distance may be defined as a constant multiplied by the standard deviation. In other examples, the threshold distance may be defined in percentage terms.

According to examples of the present disclosure, analysing the reconstruction error to determine if the assembled performance parameter values indicate an anomalous behaviour during the time window may comprise comparing the calculated reconstruction error to an established profile for normal behaviour of the performance parameter, and identifying an anomalous behaviour if the calculated reconstruction error is outside the profile for normal behaviour.

According to examples of the present disclosure, the steps of establishing a normal behaviour profile, comparing to the normal behaviour profile and identifying an anomalous behaviour may be performed on the reconstruction error itself or may be performed on the anomaly metric generated by normalising the calculated reconstruction error.

According to examples of the present disclosure, the method may further comprise assembling values observed for a plurality of network performance parameters over a time window.

According to examples of the present disclosure, constructing a time series by associating each performance parameter value with a representation of a time at which the value was observed may comprise, for each representation of a time, associating a value of each of the performance parameters observed at the represented time. According to examples of the present disclosure, calculating a reconstruction error between the time series and the reconstructed time series may comprise calculating individual reconstruction errors for each performance parameter and calculating a combined reconstruction error for all performance parameters.

According to examples of the present disclosure, the combined reconstruction error for all performance parameters may also include a reconstruction error for the representation of a time.

According to examples of the present disclosure, analysing the reconstruction error to determine if the assembled performance parameter values indicate an anomalous behaviour during the time window may comprise comparing the calculated combined reconstruction error to an established profile for normal behaviour of the combined performance parameters, and identifying an anomalous behaviour if the calculated combined reconstruction error is outside the profile for normal behaviour.

According to examples of the present disclosure, analysing the reconstruction error to determine if the assembled performance parameter values indicate an anomalous behaviour during the time window may further comprise, if the combined reconstruction error is outside the profile for normal behaviour, comparing the calculated individual reconstruction errors to established profiles for normal behaviour of the individual performance parameters, and if at least one of the calculated individual reconstruction errors is outside the profile for normal behaviour, determining that the anomalous behaviour relates to the performance parameter having a reconstruction error outside of the profile for normal behaviour. If none of the calculated individual reconstruction errors is outside the profile for normal behaviour, analysing the reconstruction error to determine if the assembled performance parameter values indicate an anomalous behaviour during the time window may further comprise determining that the anomalous behaviour relates to a combination of the performance parameters.

According to examples of the present disclosure, the method may further comprise, if it is determined that the anomalous behaviour relates to a combination of the performance parameters, displaying a representation of the time series. The combination of performance parameters may for example demonstrate a correlation during normal operation, and the anomalous behaviour may be reflected in a breakdown of that correlation, or some other abnormal combination of the performance parameters.

According to examples of the present disclosure, the representation of the time series may comprise the values of each of the performance parameters plotted against the times at which they were observed. Displaying the representation may enable a visual recognition of an anomaly in an expected correlation between values of different performance parameters.

According to examples of the present disclosure, the method may further comprise, if the assembled performance parameter values indicate an anomalous behaviour during the time window, classifying the anomalous behaviour.

According to examples of the present disclosure, the anomalous behaviour may be classified using either or both of a machine learning process or manual classification by a network operator. According to some examples of the present disclosure, a broadest classification may comprise distinguishing between true and false anomalous behaviours, with true anomalous behaviours being further investigated, and false anomalous behaviours being used to train the ANN conducting the encoding, decoding and error calculation steps such that the false anomalous behaviour is learned by the ANN and correctly identified in future.

According to another aspect of the present disclosure, there is provided a computer program comprising instructions which, when executed on at least one processor, cause the at least one processor to carry out a method according to any one of the preceding aspects and/or examples of the disclosure.

According to another aspect of the present disclosure, there is provided a carrier containing a computer program according to a preceding aspect of the disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the disclosure.

According to another aspect of the present disclosure, there is provided apparatus for analysing performance of a telecommunications network. The apparatus comprises a processor and a memory, the memory containing instructions executable by the processor such that the apparatus is operative to assemble values observed for a network performance parameter over a time window, construct a time series by associating each performance parameter value with a representation of a time at which the value was observed, and encode the time series to generate a compressed representation of the time series. The apparatus is further operative to decode the compressed representation of the time series to reconstruct the time series, calculate a reconstruction error between the time series and the reconstructed time series, and analyse the reconstruction error to determine if the assembled performance parameter values indicate an anomalous behaviour during the time window.

According to example of the present disclosure, the apparatus may be further operative to carry out a method according to any one of the preceding aspects and/or examples of the present disclosure.

According to another aspect of the present disclosure, there is provided apparatus for analysing performance of a telecommunications network. The apparatus is adapted to assemble values observed for a network performance parameter over a time window, construct a time series by associating each performance parameter value with a representation of a time at which the value was observed, and encode the time series to generate a compressed representation of the time series. The apparatus is further adapted to decode the compressed representation of the time series to reconstruct the time series, calculate a reconstruction error between the time series and the reconstructed time series, and analyse the reconstruction error to determine if the assembled performance parameter values indicate an anomalous behaviour during the time window.

According to another aspect of the present disclosure, there is provided apparatus for analysing performance of a telecommunications network. The apparatus comprises a performance parameter module for assembling values observed for a network performance parameter over a time window, a time module for constructing a time series by associating each performance parameter value with a representation of a time at which the value was observed, and an encoding module for encoding the time series to generate a compressed representation of the time series. The apparatus further comprises a decoding module for decoding the compressed representation of the time series to reconstruct the time series, an error module for calculating a reconstruction error between the time series and the reconstructed time series, and a processing module for analysing the reconstruction error to determine if the assembled performance parameter values indicate an anomalous behaviour during the time window.

BRIEF DESCRIPTION OF THE DRAWINGS

For a better understanding of the present disclosure, and to show more clearly how it may be carried into effect, reference will now be made, by way of example, to the following drawings in which:

FIG. 2 is a block diagram representing operation of an autoencoder;

FIG. 3 is a block diagram representing operation of an autoencoder according to an example of the method of FIG. 1;

DETAILED DESCRIPTION

For the purposes of the present specification, the term "observation time" refers to a time at which a value for a network performance parameter is observed. An "observation interval" or "observation window" is the length of time between observations of a network performance parameter value. This for values observed at 10:05, 10:10, 10:15 etc., 10:05, 10:10 and 10:15 are observation times and the observation interval, or frequency of observation, is 5 minutes. A "time window" is the period of time over which network performance parameter values are assembled and a time series is constructed according to example methods of the present disclosure. In some examples of the present disclosure, a time window may be determined by a frequency of observation of network performance parameters and a decision as to how much historical data should be considered to provide context to each new observation. Thus, in some examples, a time window may be defined as an observation interval multiplied by the number of historical observations to be taken into account. For an observation interval of 5 minutes and a decision to consider 10 historical observations, a time window of 50 minutes may therefore be defined.

Figure 1:
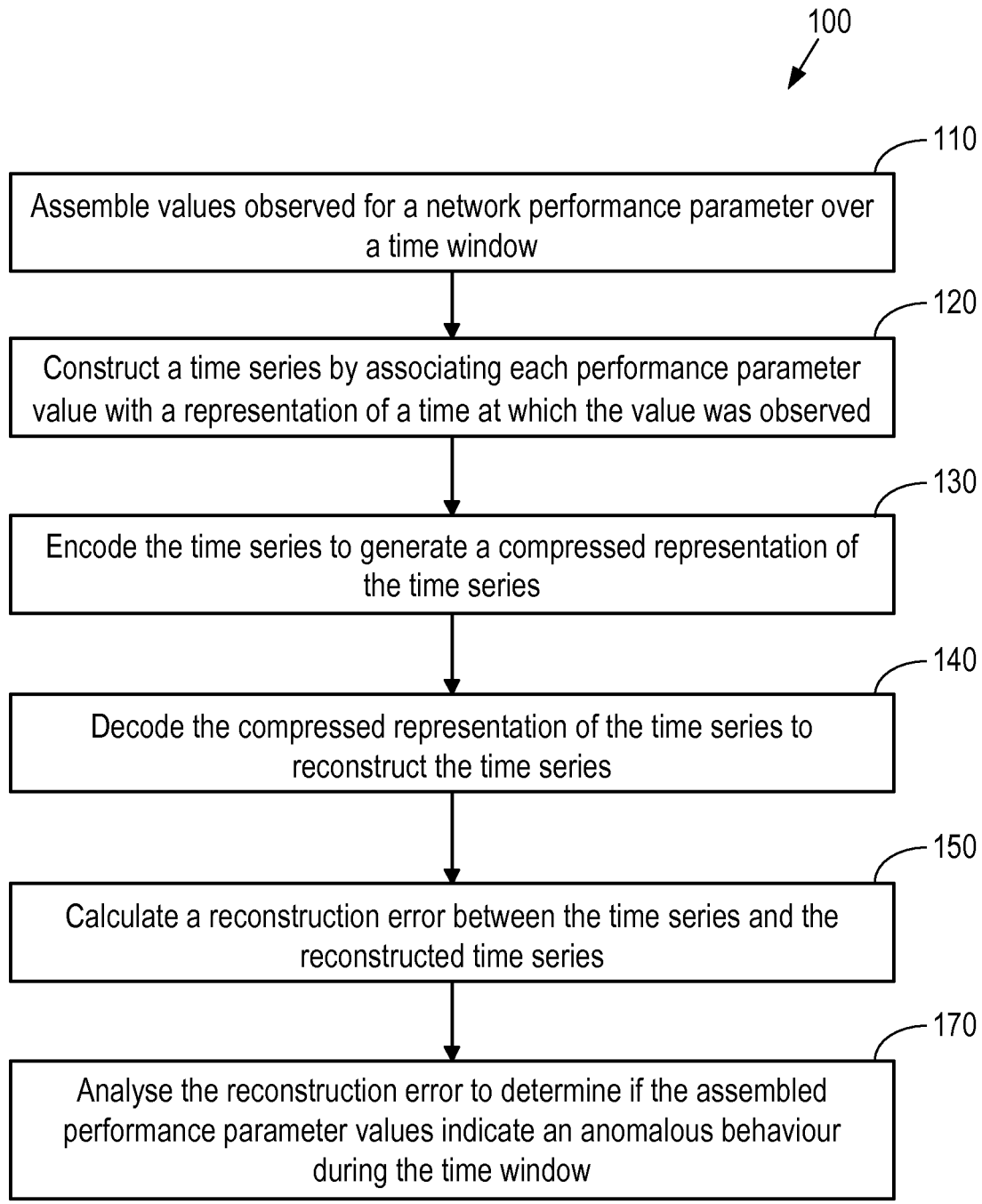
FIG. 1 is a flow chart illustrating process steps in a method for analysing performance of a telecommunications network.

Aspects of the present disclosure provide a method 100 according to which performance of a telecommunications network may be analysed to determine whether or not observed performance parameter values indicate anomalous behaviour of the network. Referring to FIG. 1, in a first step 110, the method comprises assembling values observed for a network performance parameter over a time window. The performance parameter may be any performance parameter reflecting performance of any aspect of the telecommunications network. The performance parameter may for example be a KPI selected by a network operator or other authority. Examples of performance parameters may include number of active users in a geographic area number of handovers to/from a geographic area, volume of downloaded data, average latency etc. The geographic area may comprise a single cell or a group of cells. The time window may also be selected or defined by a network operator or other authority, and may range from a few minutes to several hours to a period of several weeks or months. A long time window may for example be used for offline learning of normal network behaviour patterns, using all available data for a historic period of time to train the method. During online operation, shorter time windows of several minutes to several hours may be defined.

In a second step 120, the method comprises constructing a time series by associating each performance parameter value with a representation of a time at which the value was observed. The time may be a time of day, for example in 24 hour format, and/or may be a day of the week, week of the year or month of the year. The time may thus enable the performance parameter value to be situated within a 24 hour operating window, thus distinguishing between day, evening and night time operation, within a week long operating window, thus distinguishing between weekday and weekend operation, and/or within a year long operating window, thus distinguishing between popular working and holiday periods, summer/winter operation etc. In step 130, the method comprises encoding the time series to generate a compressed representation of the time series. The method then comprises in step 140 decoding the compressed representation of the time series to reconstruct the time series, and in step 150 calculating a reconstruction error between the time series constructed at step 120 and encoded at step 130 and the reconstructed time series decoded at step 140. The method 100 then comprises, at step 170, analysing the reconstruction error to determine if the assembled performance parameter values indicate an anomalous behaviour during the time window.

In some examples of the method 100, as discussed in further detail below, the method may comprise repeating the steps of encoding 130 the constructed time series, decoding 140 the encoded time series and calculating 150 a reconstruction error between the original time series encoded at step 130 and the reconstructed time series. These steps may be repeating during a learning phase, and, between each repetition of the steps, parameters used in the encoding and/or decoding steps 130, 140 may be refined in order to minimise the calculated reconstruction error. In this manner, the method may learn, during the learning phase, how to accurately reconstruct an input time series comprising performance parameter values associated with a representation of the time at which the values were observed in the network. The training data used for this learning phase may enable the method to establish normal behaviour patterns for the network, so assisting with the final analysis step 170 during operation of the method, in which the reconstruction error is analysed to determine if the assembled performance parameter values indicate an anomalous behaviour during the time window. The learning phase may be conducted offline, for example on batches of historical data, or may be conducted online in a substantially continuous manner, with normal behaviour patterns for the network being regularly updated on the basis of newly available data.

In some examples of the method 100, the steps of encoding 130 the time series to generate a compressed representation of the time series, decoding 140 the compressed representation of the time series to reconstruct the time series, and calculating 150 a reconstruction error between the time series and the reconstructed time series may be performed by an Artificial Neural Network (ANN). The ANN may in some examples be comprised within an autoencoder.

Autoencoders may be used in the field of robotics for detecting anomalous behaviour of robotic limbs. As illustrated in FIG. 2, an autoencoder 200 comprises an encoder 210 and a decoder 220. The encoder converts an input signal into a compressed representation. The decoder then attempts to reconstruct the original input signal from the compressed representation. The autoencoder may be tuned during a training phase to minimize the reconstruction error between the reconstructed and original input signals. After the training phase, an abnormally high reconstruction error occurs when the decoder is unable to accurately reconstruct the input signal. This is indicative of an input signal that does not follow the normal pattern or structure followed by the input signal from the training phase, and thus a potential anomaly in the data. Autoencoders as deployed in the field of anomaly detection for robotic limbs are unable to recognise seasonal variation in normal behaviour, which variation is strongly present in telecommunications network data. Additionally, no means has been developed to detect which feature of those analysed by an autoencoder for robotic limb anomaly detection actually caused a detected anomaly.

FIG. 3 illustrates haw an autoencoder 300 may be used to conduct the encoding, decoding and calculating steps of the method 100. Referring to FIG. 3, the time series constructed in step 120 of the method 100 is input to the autoencoder 300 as the input signal. The reconstructed time series is output by the autoencoder 300, allowing the calculation of the reconstruction error. By associating the performance parameter values with a representation of the time at which they were observed in the input time series, the time of observation becomes an integral part of the input data reflecting the behaviour of the network. The autoencoder may thus learn normal seasonal variation of network performance parameters, so that a value that would be considered anomalous at one time of day, or day of the week, is recognised as normal behaviour for a different time of day or day of the week.

FIGS. 4a to 4d illustrate process steps in another example of method 400 for analysing performance of a telecommunications network. The method 400 of FIG. 4 illustrates one way in which the steps of the method 100 may be implemented and supplemented to achieve the above discussed and additional functionality.

Figure 4A:
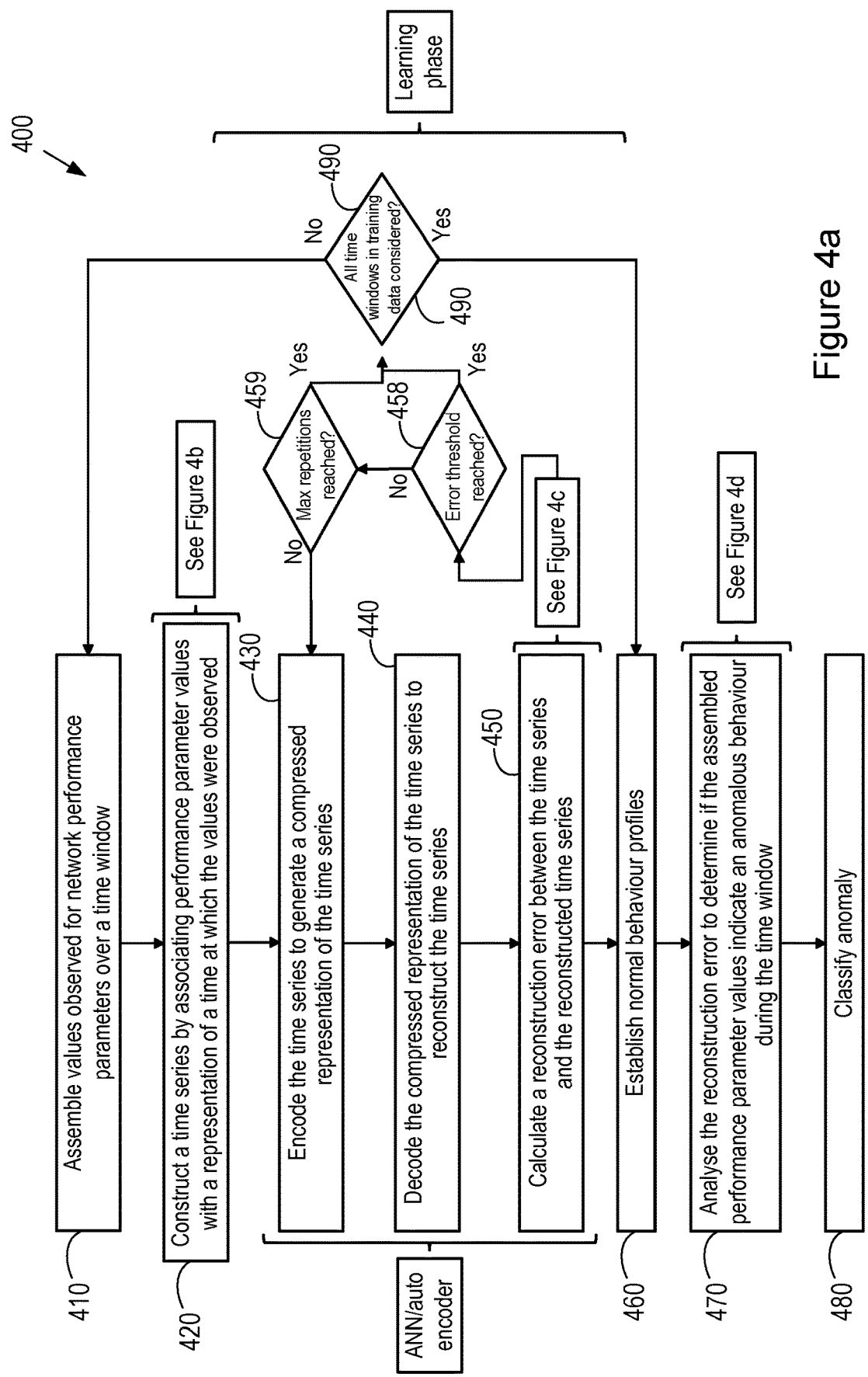
FIGS. 4a to 4d illustrate a flow chart illustrating process steps in another example of a method for analysing performance of a telecommunications network.

Referring first to FIG. 4a, in a first step 410, the method 400 comprises assembling values observed for a plurality of network performance parameters over a time window. As discussed above, the time window may be determined by a network operator and may vary according to whether the method is being performed in an online mode with continuous updates of real-time data, or in an offline mode, using historical data for a learning phase. The time window may in some examples be determined by a frequency of observation of network performance parameters and a decision as to how much historical data should be considered to provide context to each new observation. In some examples, a time window may be defined as an observation interval multiplied by the number of historical observations to be taken into account. Thus for an observation interval of 5 minutes and a decision to consider 10 historical observations, a time window of 50 minutes may be defined. The network performance parameters may be any network performance parameters representing some aspect of performance of the telecommunications network.

In step 420 the method 400 comprises constructing a time series by associating observed performance parameter values with a representation of a time at which the values were observed. This step is illustrated in more detail in FIG. 4b.

Figure 4B:
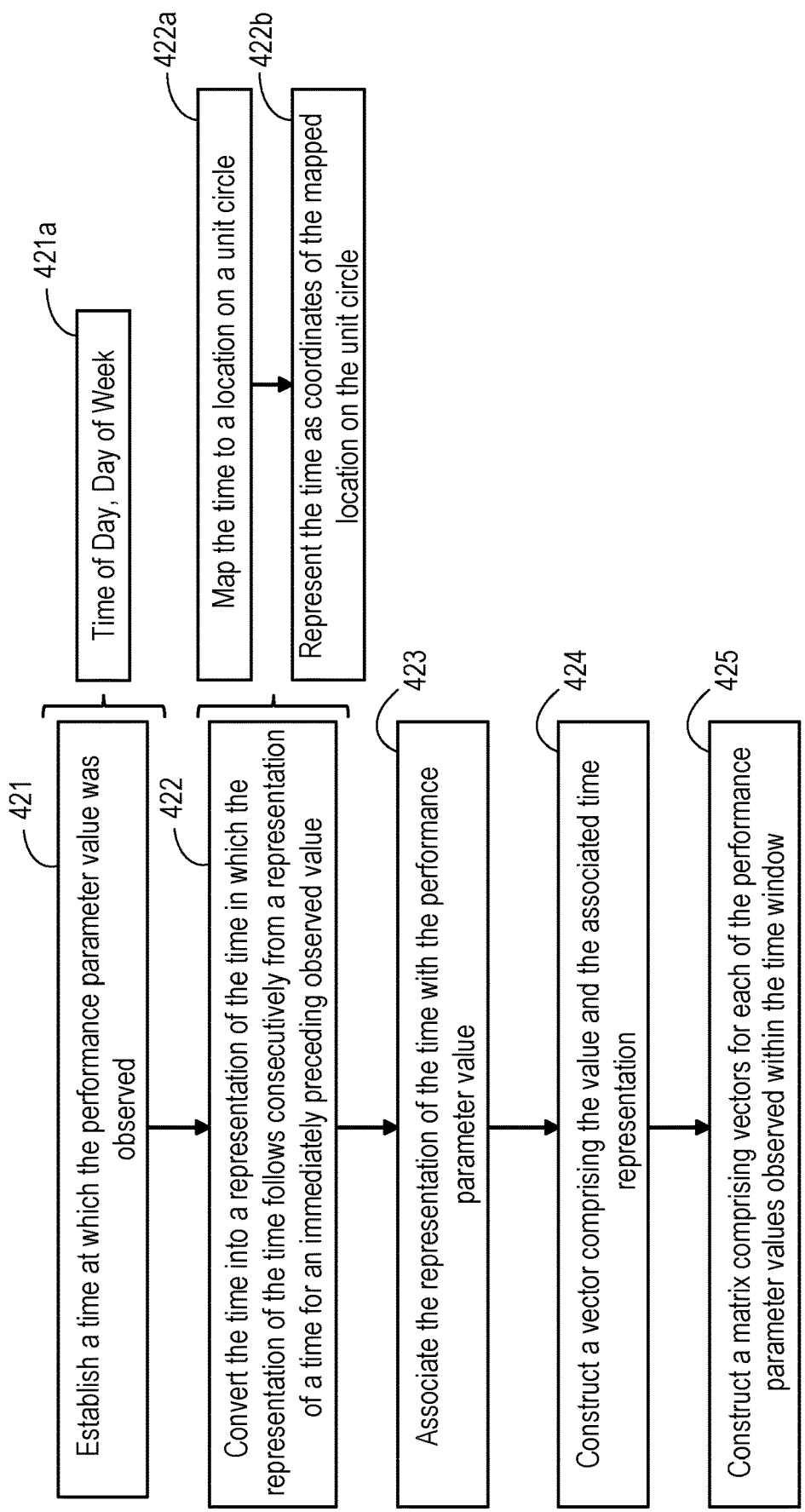

Referring to FIG. 4b, for a first network parameter, the step 420 of constructing a time series comprises establishing a time at which a performance parameter value was observed 421. As discussed above and illustrated at 421a, the time may comprise multiple elements indicating time of day, day of week, week and/or month of year etc. In step 422, the time is converted into a representation of the time in which the representation of the time follows consecutively from a representation of a time for an immediately preceding observed value. It will be appreciated that the frequency of observation, or sampling interval, for observation of network parameter values may vary, and as an example a sampling frequency of 5 minutes may be considered. Around midnight, consecutive time entries for time of day of observed network parameter values may thus be 23:50, 23:55, 00:00, 00:05 etc. These entries may not always be considered as consecutive when assembled into a time series, and so an operation may be used to convert these entries to a representation in which they do appear as consecutive. As shown in step 422a, the time entries may be mapped to a location on a unit circle, and in step 422b, the time may be represented as coordinates of the mapped location on the unit circle. The coordinates may be in any suitable coordinate system. This conversion may be performed for each element of the time, including time of day, day of week, etc.

Figure 5:
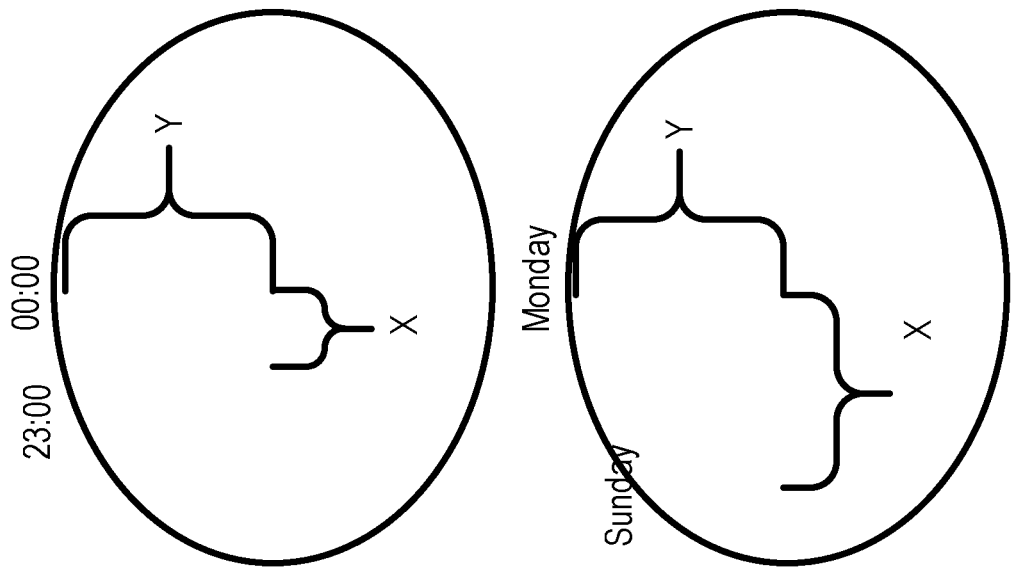
FIG. 5 illustrates an example process for conversion of a time into a representation of a time.

The mapping and representation steps 422a and 422b are illustrated in FIG. 5 for a time of day and day of week converted to Cartesian coordinates x and y of mapped locations on a unit circle. The coordinate values may also be normalised. The formulae below may be used to calculate the x and y coordinates for a first time element comprising time of day and a second time element comprising day of the week:

$x\_hourofday=\sin(2*pi*hourofday/24)$ $y\_hourofday=\cos(2*pi*hourofday/24)$ $x\_DoW=\sin(2*pi*DoW/7)$ $y\_DoW=\cos(2*pi*DoW/7)$ Normalisation of the coordinate values may be conducted in a separate step, or may be performed through modification of the above formulae before the time representation is associated with a parameter value to construct the time series. The coordinates may be normalised to values between 0 and 1 or between −1 and 1, depending upon individual algorithm requirements. The representation of time illustrated in FIG. 5 and discussed above is merely one example of a representation of time that may be used according to examples of the method 100 and 400. Other representations may be envisaged. For example, in the case of a series with a set frequency, the representation may be a sequence number, such that with knowledge of when the sequence started and the frequency of sampling then the time corresponding to the sequence number may be established.

In step 423, the representation of time is associated with the performance parameter value observed at the established time which is represented. The parameter value may be normalised, for example to a value between 0 and 1 by dividing the parameter value by the maximum possible value for that parameter. In step 423, a vector is constructed comprising as elements the representation of time and the associated parameter value.

The representation of time may itself comprise more than one element, each element comprising a coordinate set. Thus for example the representation of time may comprise a first element of coordinates for a time of day and a second element of coordinates for day of the week. The vector may be completed by associating values, which may be normalised values, for all of the observed network performance parameters that were observed at the represented time. Thus the vector may comprise one or more representation of time elements followed by a plurality of performance parameter elements, each performance parameter element comprising a value, which may be a normalised value, of a performance parameter which was observed at the represented time. In step 425, a matrix is constructed comprising vectors for performance parameter values observed over the time window.

For each observation of network parameters, a plurality of historical parameter values may be considered to help to represent the trend of the values, as discussed above. A parameter "NumberOfHistoricValues" may be defined to capture the amount of historical data to be taken into account. In an example implementation, a "NumberOfHistoricValues" of 10 may be used, such that for each vector comprising a representation of time and associated parameter values, the parameters values for the 10 preceding observations may be considered for the following encoding and decoding steps. The parameter "NumberOfHistoricValues" thus defines the size of a sliding processing window which may be used in the encoding and decoding of the time series.

Table 1 below illustrates an extract of an example matrix comprising time representation and normalised parameter values for an observation frequency of of 5 minutes.

TABLE 1

| Actual time value | Normalised parameter 1 | Normalised parameter 2 | Time of day representation | Day of week representation |
|---|---|---|---|---|
| 10:00 (current time) | 0.4 | 0.5 | $x_{1a}, y_{1a}$ | $x_{1b}, y_{1b}$ |
| 09:55 | 0.4 | 0.5 | $x_{2a}, y_{2a}$ | $x_{2b}, y_{2b}$ |
| 09:50 | 0.3 | 0.3 | . . . | . . . |
| 09:45 | 0.3 | 0.3 | . . . | . . . |
| . . . | . . . | . . . | . . . | . . . |

Referring again to FIG. 4a, once the time series has been constructed at step 420, the method 400 comprises encoding the time series to generate a compressed representation of the time series at step 430. The compression applied in step 430 may vary, and in some examples may be a compression of between 2 and 10 times, for example a compression of 5 times. As discussed above, this step may be performed by an autoencoder, and specifically by the encoder unit of an autoencoder. The method 400 then comprises decoding the compressed representation of the time series to reconstruct the originally input time series in step 440. This step may also be performed by an autoencoder, and specifically by the decoder unit of an autoencoder. The method then comprises calculating a reconstruction error between the time series and the reconstructed time series in step 450. This step may also be performed by an autoencoder. The steps which may be involved in the calculation of a reconstruction error are discussed in further detail below with reference to FIG. 4c.

During a learning phase, the steps 430 to 450 may be repeated for a plurality of different constructed time series, such that a normal behaviour of the network represented by the observed network parameter values may be learned. Learning phase repetitions are illustrated in steps 458, 459 and 490 of FIG. 4a. In step 458, following calculation of a reconstruction error between the reconstructed time series and the original input time series at step 450, the method 40 comprises, during a learning phase, checking whether or not an error threshold has been reached. This error threshold may represent a maximum magnitude for the reconstruction error that is considered to be acceptable. If the error threshold has not yet been reached, and the reconstruction error is thus still too high, the method then checks at step 459, whether or not a maximum number of repetitions has been reached for the current time series data. If the maximum number of repetitions has not yet been reached, then the method 400 returns to step 430, re-encoding the time series, decoding the time series and recalculating the reconstruction error. Between each repetition of the encoding, decoding and error calculation steps, parameters used in the encoding and/or decoding are adjusted so as to improve the accuracy of the reconstruction. The parameters adjusted may be weighting factors applied in the decoding of the compressed representation. With each adjustment of parameters, the intent is to reduce the reconstruction error until the error threshold is reached, indicating that the reconstruction error has been reduced to an acceptable magnitude. Once an acceptable magnitude has been reached, this indicates that the model of the behaviour of the network has been learnt on the basis of the current time series, with the method being able to encode and decode the time series with acceptable accuracy.

Once the error threshold has been reached, or if the maximum number of repetitions has been reached, the method then comprises, at step 490, checking whether all time windows in the training data have been considered. It will be appreciated that the check at step 459 regarding the maximum number of repetitions acts as a safety to ensure that the method does not continuously cycle through steps 430 to 450 with a time series for which it does not manage to converge to an acceptable reconstruction error magnitude.

If all of the time windows in the training data for the learning phase have not yet been considered, the method returns to step 410 to assemble values observed for a new time window in the training data, construct a time series at step 420 and repeat the encoding, decoding and error calculation steps 430 to 450 until an acceptable magnitude of reconstruction error is reached. The time windows comprised within the training data for the learning phase may vary depending upon whether online or offline learning is being performed. In the case of offline learning, a very large amount of historical data may be available for learning the normal behaviour of the network. In the case of online learning, the method may continue to refine its understanding of normal behaviour by continuously learning on the basis of new network data as it becomes available. The processes of anomaly detection and learning may thus continue substantially concurrently. In some examples of the present disclosure, a combination of an initial period of offline learning followed by continuous online learning may be employed. In this manner, normal network behaviour patterns may be learned on the basis of historical data during the offline learning phase, and these normal network behaviour patterns may be continually updated and refined during the ongoing online learning.

Once all time windows in the training data have been considered, the method proceeds to establish normal behaviour profiles in step 460, as discussed in further detail below.

Figure 4C:
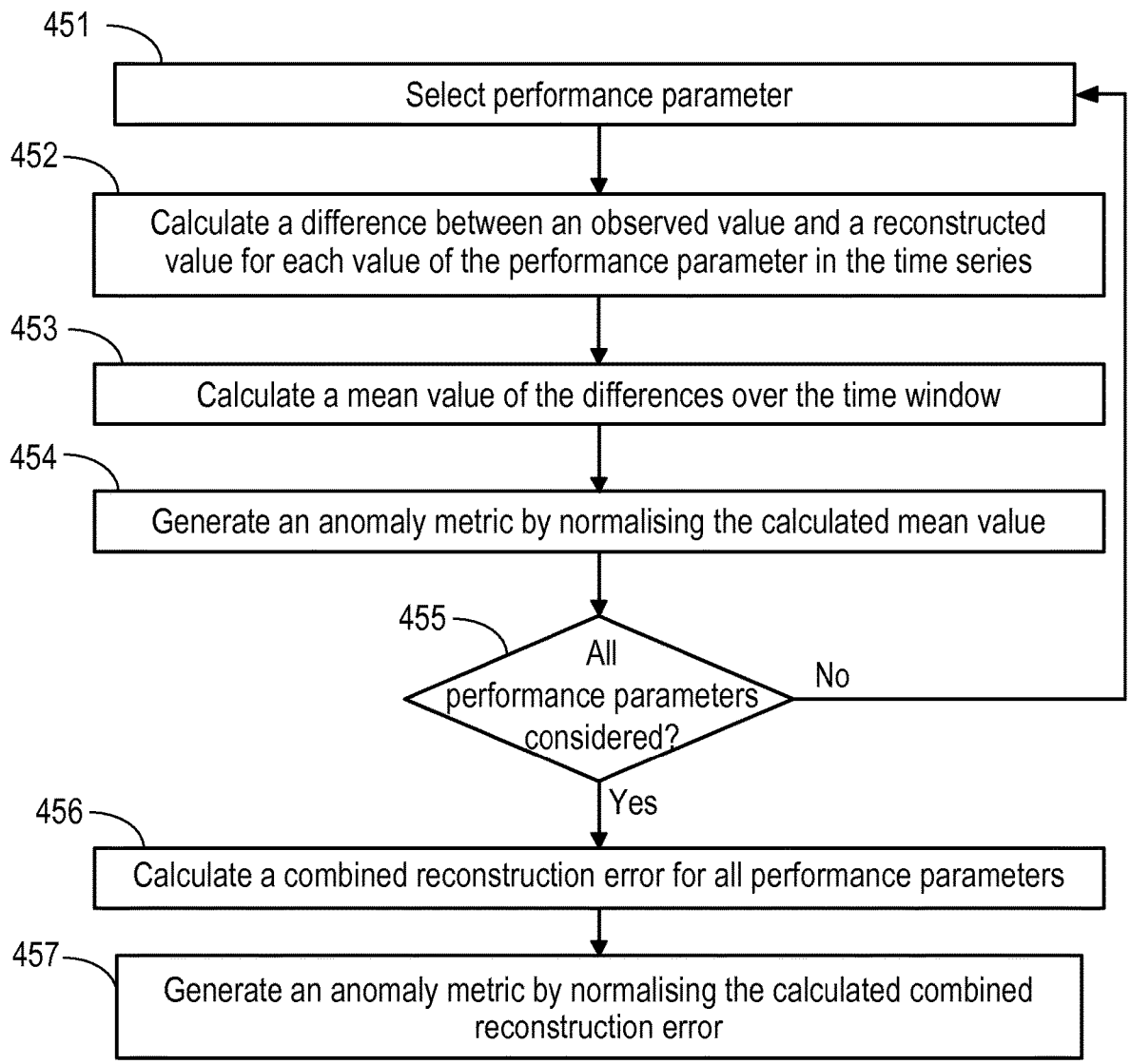

Returning to step 450 and the calculation of a reconstruction error between the reconstructed time series and the originally input time series, the steps which may be comprised within this calculation are illustrated in FIG. 4c.

Referring to FIG. 4c, in a first step 451, a performance parameter is selected, after which a difference is calculated between an observed value and a reconstructed value for each value of the performance parameter in the time series at step 452. A mean value of the difference between the reconstructed and observed values for the performance parameter is then calculated in step 453 and an anomaly metric is generated in step 454 by normalising the calculated mean value, for example to a value between 0 and 1. A check is then performed in step 455 as to whether all performance parameters have been considered. If all performance parameters have not yet been considered then the method returns to step 451 to select a new performance parameter and repeat steps 452 to 454 to generate an anomaly metric for the newly selected performance parameter. These steps are then repeated until all performance parameters have been considered. In some examples, the elements of the time representation may also be considered in this manner, with an anomaly metric being generated for each element of the time representation (time of day, day of the week etc.) based on a mean difference between the reconstructed and original values of the time representation elements. Joint time/performance parameter anomaly metrics may also be generated by combining an individual performance parameter anomaly metric with anomaly metrics for elements of the time representation. Such metric may assist in identifying anomalies related to combinations of individual performance parameter values and times at which the values were observed. Once an anomaly metric has been generated for all of the performance parameters, and in some examples the time representations, a combined reconstruction error is calculated for all performance parameters (including time representations if calculated) at step 456. This combined reconstruction error may be calculated in a similar manner to the individual reconstruction errors, based on a mean value of the individual reconstruction errors. A combined anomaly metric is then generated at step 457 by normalising the combined reconstruction error, for example to a value between 0 and 1.

In alternative examples, a combined reconstruction error may be calculated before the individual parameter reconstruction errors are calculated. The combined reconstruction error may then be considered as discussed in further detail below, and if the combined error does not indicate an anomaly then calculation of the individual parameter reconstruction errors may be omitted.

Referring again to FIG. 4*a*, in step 460, the method 400 comprises establishing normal behaviour profiles for the network. This may comprise conducting a statistical analysis of the reconstruction errors and/or anomaly metrics generated for the training data. The statistical analysis may for example describe a distribution of the reconstruction error or anomaly metric for each performance parameter, and for the combined error or anomaly metric. A threshold may then be set describing the boundary between normal and abnormal reconstruction error or anomaly metric. For network behaviour that falls within the normal behaviour pattern learned during the learning phase, the model represented by the encoding and decoding settings refined during the learning phase will be reasonably accurate, resulting in a relatively small reconstruction error or anomaly metric. For behaviour that departs from the normal patterns learnt during the learning phase, the encoding and decoding settings will not result in an accurate reconstruction of the time series, and the reconstruction error will therefore be larger. A larger reconstruction error will thus be used as an indication of anomalous behaviour reflected by the observed parameter values under consideration. A percentile may in some examples be used to set a threshold for anomalies. For example the top 1% percentile of reconstruction errors during the learning phase may give the threshold for anomalies. In other examples, the threshold may be a constant multiplied by the standard deviation of the reconstruction error.

Depending upon where the threshold for normal behaviour is set with reference to the statistical distribution of reconstruction errors, it may be the case that errors outside the threshold, and hence potential anomalies, are present in most data sets. Some of these potential anomalies may be false alarms, and may not therefore indicate any actual fault or other situation requiring further analysis. A detected anomaly may thus be used as an indication to look in more detail at the underlying data rather than as definitive evidence of a fault in the network. The setting of the thresholds to indicate anomalous behaviour may be refined over time to minimise the number of false alarms.

Figure 4D:
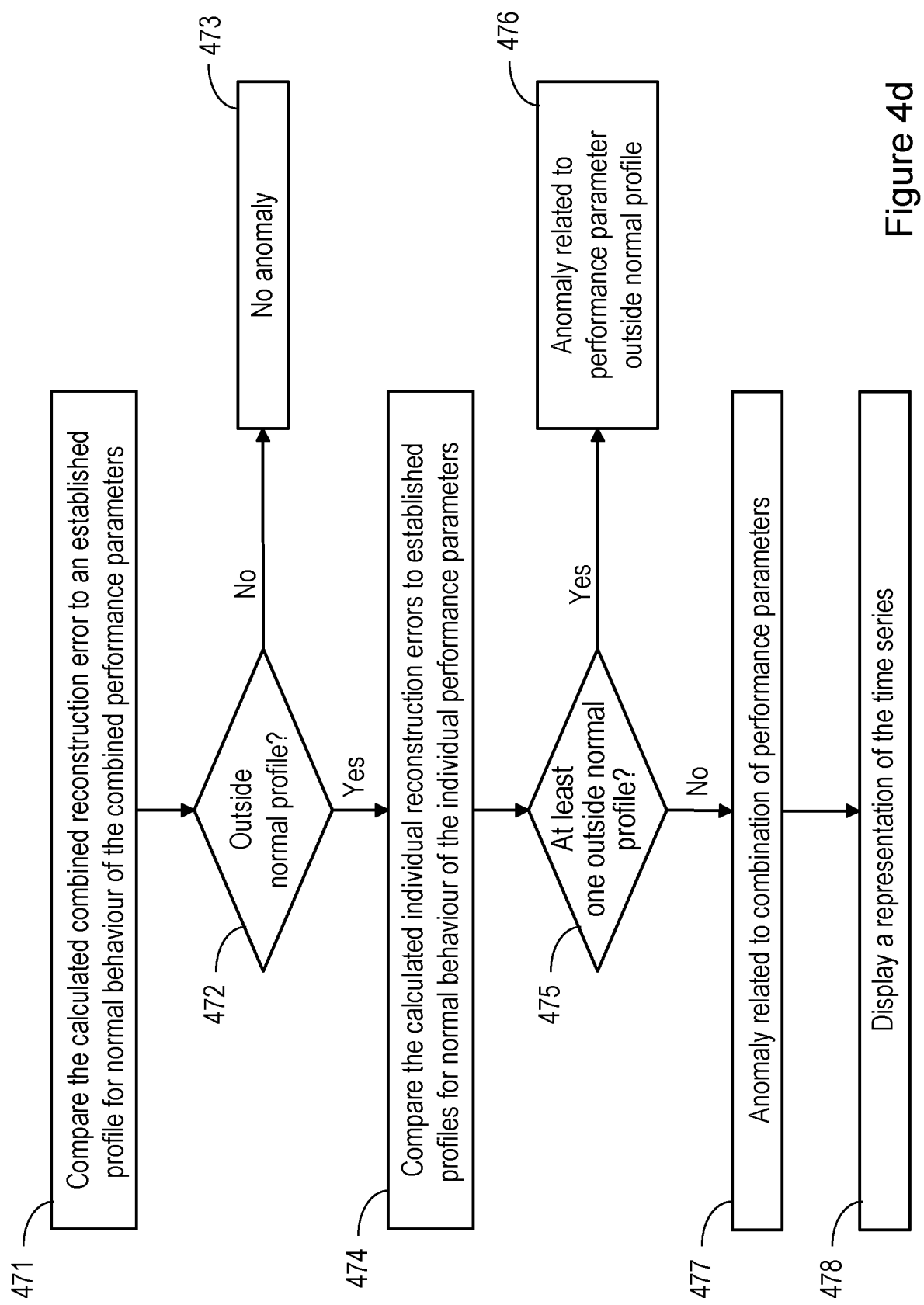

The method 400 then proceeds to step 470 and analyses the reconstruction error to determine if the assembled performance parameter values indicate an anomalous behaviour in the network during the time window. This step is illustrated in detail in FIG. 4*d*. Referring to FIG. 4*d*, in a first step 471, the calculated combined reconstruction error, or anomaly metric, may be compared to a profile for normal behaviour of the combined reconstruction error or anomaly metric established in step 460. At step 472, a check is made as to whether the combined reconstruction error or anomaly metric is outside the normal profile. If the combined reconstruction error or anomaly metric is not outside the normal profile, then it is determined that no anomaly is present in the time window at step 473. If the combined reconstruction error or anomaly metric is outside the normal profile, then an anomalous behaviour is reflected in the observed parameter values for the time window, and further analysis is conducted to identify whether the anomalous behaviour is related to one or more individual performance parameters or to a combination of performance parameters. In step 473, a comparison is made between the individual performance parameter reconstruction errors or anomaly metrics and the established normal profiles for the behaviour of the individual performance parameters. This comparison may also include the time representation elements as discussed above. If at least one of the individual performance parameter reconstruction errors or anomaly metrics is found to be outside the normal profile for that parameter in step 475, then a determination is made at step 476 that the anomalous behaviour is related to that or those performance parameters having a reconstruction error or anomaly metric outside the normal profile. If none of the individual performance parameter reconstruction errors or anomaly metrics are outside the normal profiles, then it is determined at step 477 that the anomalous behaviour is related to a combination of performance parameters, and at step 478 a representation of the time series is displayed to aid identification of the anomaly.

Examples of anomalous behaviours related to an individual parameter and to a combination of parameters are illustrated in example scenarios 1 and 2 represented in the tables below.

Table 2 below illustrates an output from the analysis step 470 for a first example scenario in which two performance parameters have been monitored during a half hour time window from 12:00 to 12:30; a first performance parameter, labelled KPI1, is the number of active users in a geographic area and a second performance parameter, labelled KPI2, is the number of handovers in the geographic area.

TABLE 2

| Parameter | Anomaly metric | Time Window | Area/cell |
|---|---|---|---|
| Combined | High | 12:00-12.30 | 2 |
| KPI1 | Medium | 12:00-12.30 | 2 |
| KPI2 | High | 12:00-12.30 | 2 |

The anomaly metric for each parameter is labelled as high if it is outside the normal behaviour profile, medium if it is just within the normal behaviour profile, and low if it is well within the normal behaviour profile.

The output illustrated in Table 2 indicates there was some abnormal behaviour in the area/cell 2 in the time window 12.00-12:30. The anomalous behaviour is linked to the performance parameter "number of handovers", and so the anomalous behaviour was liked to mobility within the geographic area 2, for example an abnormally high or low number of users entering or leaving the area 2. The geographic area 2 could be comprised of a single cell or multiple cells.

Table 3 below illustrates an output from the analysis step 470 for a second example scenario in which two performance parameters have been monitored during a half hour time window from 10:30 to 11:00; a first performance parameter, labelled KPI1, is the number of active users in a geographic area and a second performance parameter, labelled KPI2, is the volume of downloaded data in the geographic area.

TABLE 3

| Parameter | Anomaly metric | Time Window | Area/cell |
|---|---|---|---|
| Combined | High | 10:30-11:00 | 2 |
| KPI1 | Low | 10:30-11:00 | 2 |
| KPI2 | Low | 10:30-11:00 | 2 |

As in Table 2, the anomaly metric for each parameter is labelled as high if it is outside the normal behaviour profile, medium if it is just within the normal behaviour profile, and low if it is well within the normal behaviour profile.

Figure 6:
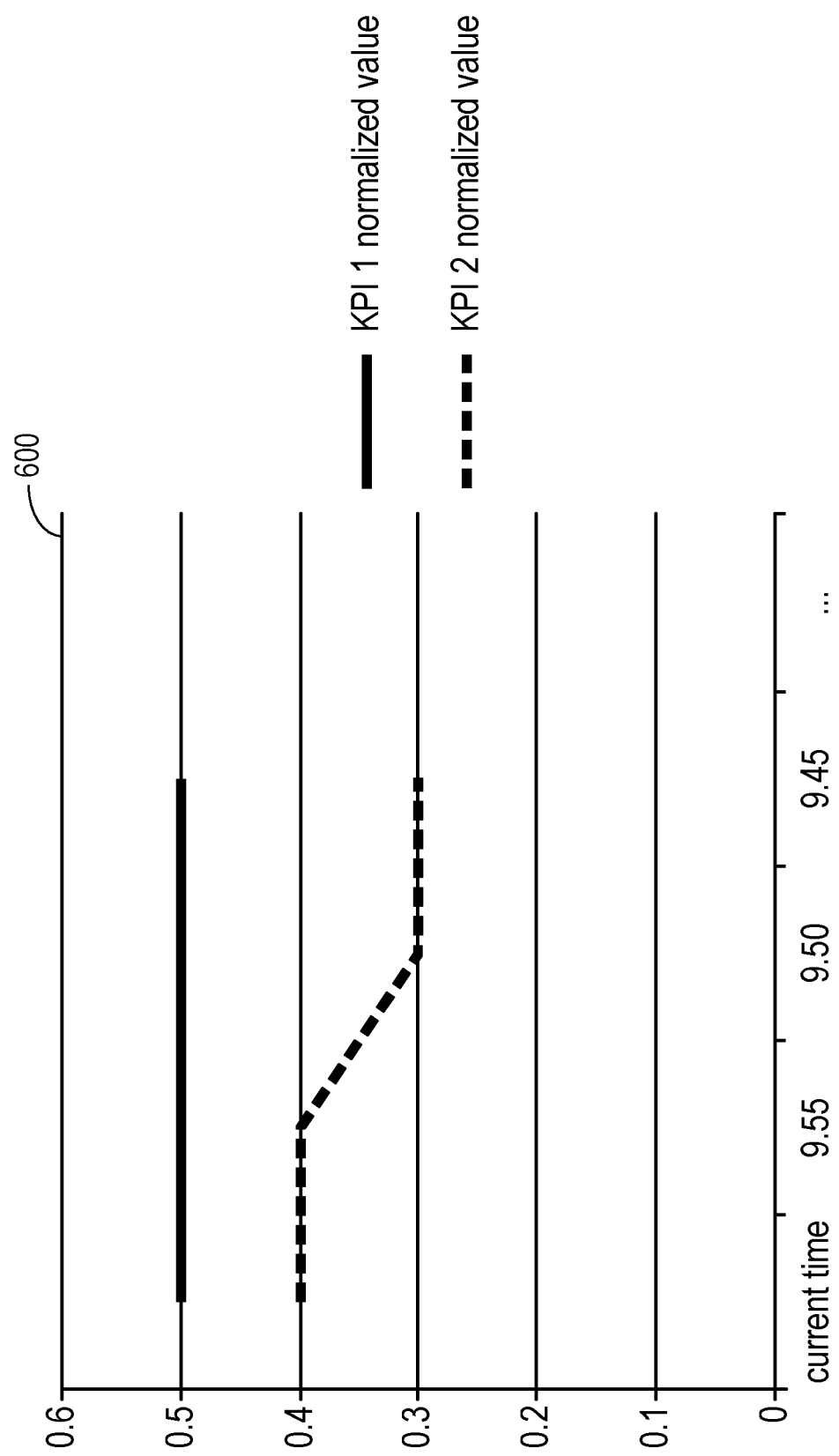
FIG. 6 is a graph illustrating loss of correlation between KPI values.

The output illustrated in Table 3 indicates there was some abnormal behaviour in the area/cell 2 in the time window 10:30-11:00. As the combined anomaly metric is high but the anomaly metric for the individual performance parameters are low, the anomaly may be related to an abnormal combination of performance parameter values. The performance parameter values may therefore be displayed, as illustrated in FIG. 6, to enable identification of the anomaly. Referring to FIG. 6, it would be expected that the number of active users and the volume of downloaded data should be correlated, such that if the number of active users increases then the volume of downloaded data also increases. However, it can be seen from the graph of FIG. 6 that during the time window under consideration, the number of active users increases but the volume of downloaded data remains constant. This may indicate a network problem with capacity in the geographic area 2. For example, reduced transmission capacity may have been experienced as a consequence of a link failure between the relevant basestation and the core network.

In some examples in which a large number of performance parameters are observed, multiple combined reconstruction errors and/or anomaly metrics may be calculated, each one grouping together performance parameters which are typically correlated or closely related. This may assist with identifying which group of performance parameters is at the root of a detected anomaly when no individual performance parameter is outside its normal behaviour pattern, and when visual identification may be complicated by the number of performance parameters monitored.

The analysis of reconstruction error to determine if assembled performance parameter values indicate anomalous behaviour may be performed either online on real-time data with a new analysis step with each observation of data values, or may be performed offline on batches of data.

During online operation, the method 400 may be used to detect anomalies continuously as new time series data arrives. Using the example of an observation frequency of 5 minutes and a NumberOfHistoricValues parameter of 10, during online operation, at each 5 minute interval, performance parameter values for that interval are assembled into a time series with the observed values for the 10 preceding 5 minute time intervals and the assembled time series is sent to the autoencoder. The reconstruction errors and anomaly metrics are then calculated and analysed to determine if an anomalous behaviour is indicated during the time window. If an anomaly is indicated, and if further consideration indicates that the anomaly is a genuine anomaly and not a false alarm, then the observation values for the time window may be removed from historical data used for learning, so as to ensure that the method does not continue online learning, or perform later offline learning on anomalous data. The identified anomaly may then be classified in step 480 illustrated in FIG. 4a and discussed in further detail below.

During offline operation, the method 400 may be used to detect anomalies in batches of data, for example on a recurring schedule (weekly, monthly etc.) or after detection of a fault in order to better understand the causes of the fault. The data for the appropriate period, (the preceding week, month or a period of time before the detected fault) is analysed in time windows as for online operation, each observation interval corresponding to a new time series constructed with the appropriate number of preceding values according to the parameter "NumberOfHistoricValues". As in online operation, if an anomaly is indicated, and if further consideration indicates that the anomaly is a genuine anomaly and not a false alarm, then the observation values for the time window may be removed from the historical data used for learning, so as to ensure that the method does not perform learning on anomalous data. The identified anomaly may then be classified in step 480 illustrated in FIG. 4a and discussed in further detail below.

Figure 7:
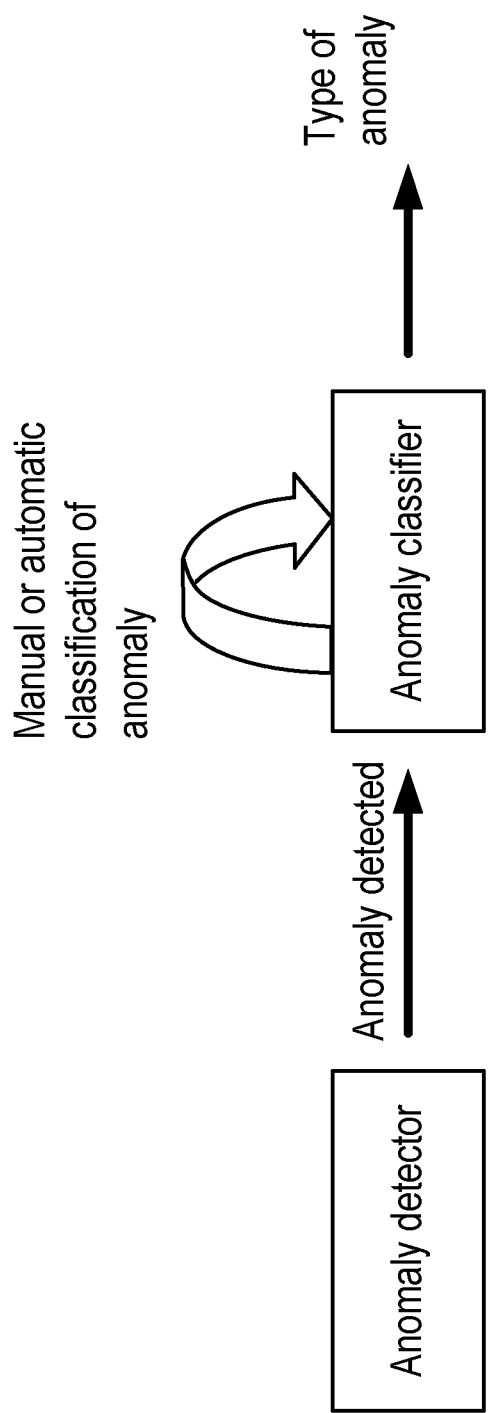
FIG. 7 is a block diagram representing anomaly classification.

Anomaly classification is illustrated in FIG. 7, and may involve either or both of manual and/or automatic classification of anomalies. For example, manual intervention may be used to provide labelled training data to train a machine learning model to operate as an automatic anomaly classifier 700. Once the automatic anomaly classifier has been trained, then further manual intervention may only be required when a new anomaly type is identified which does not conform to the labelled training data. In further examples of the present disclosure, a trained automatic anomaly classifier may be used to identify and remove anomalous data before that data is input to the anomaly detection method 400 during a learning phase. In this manner, the risk of training the method 400 on anomalous data may be reduced. During operation of the method 400 to identify new anomalies in online or offline data, an anomaly classifier may still be deployed at the end of the method 400, to implement step 480 and classify newly identified anomalies. A trained anomaly classifier may also be used as a first filter to identify potential false alarms such as entertainment events, sports matches etc. which may closely resemble anomalies but may, by their characteristic variations in performance parameters, be identified and flagged by an anomaly classifier before the corresponding data is analysed according to the method 400.

Figure 8:
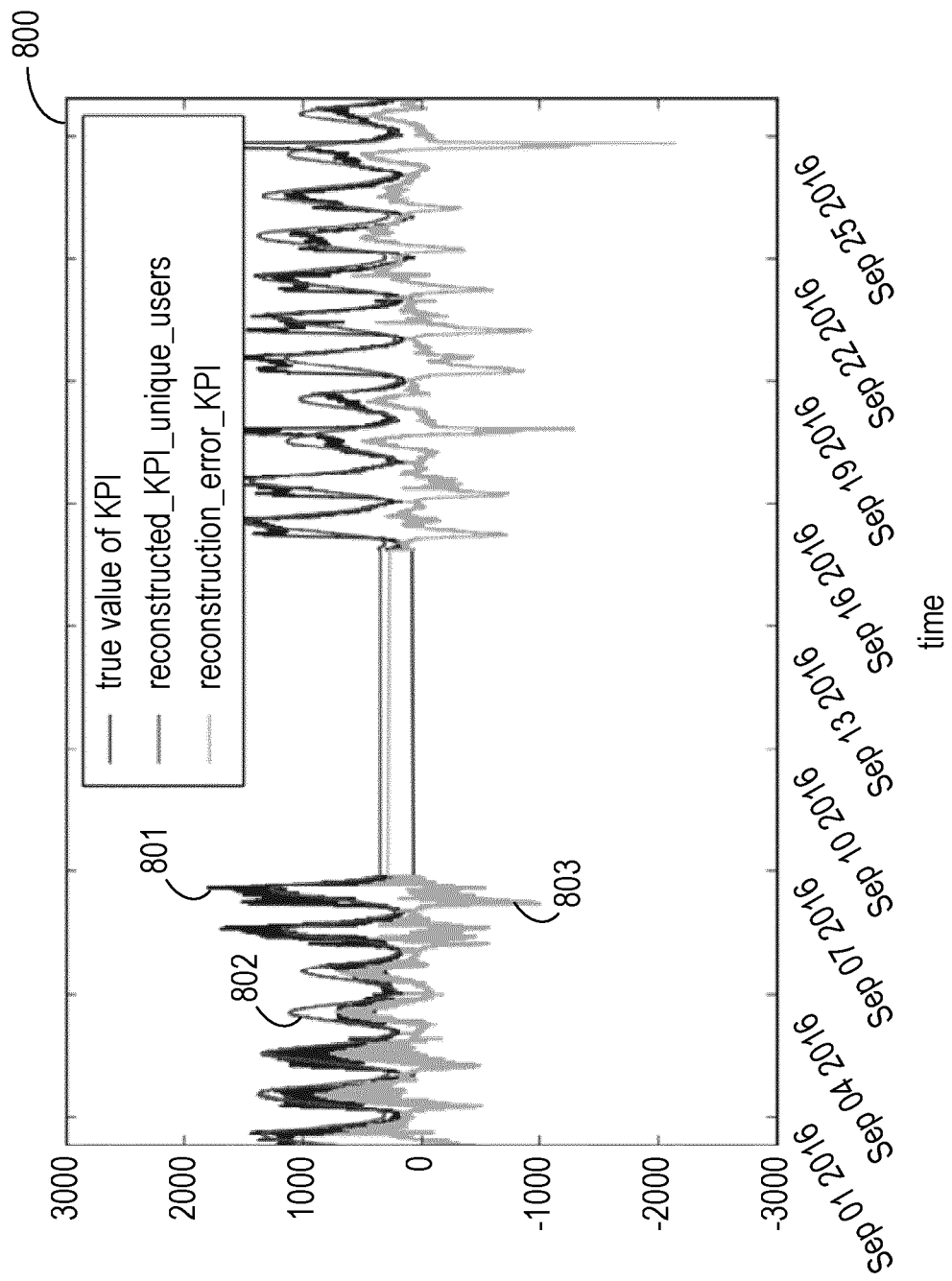
FIG. 8 is a graph illustrating the results of a method for analysing performance of a telecommunications network.

FIG. 8 illustrates the results of testing of the method 400 performed using data from Event Data Records EDRs provided by a telecommunications operator and accumulated every 5 minutes for 3 weeks. The test data was accumulated from a number of cells in a single geographic area and includes a data gap between the $8^{th}$ and $16^{th}$ September, when no data was collected. The results graph 800 of FIG. 8 illustrates a performance parameter of number of active users in the area and presents the actual observed values of the parameter used to construct the time series input to the autoencoder performing steps 430 to 450 (graph 801), the reconstructed values of the parameter output from the anomaly detector (graph 802), and the reconstruction error that is the difference between the observed and reconstructed values (graph 803). As discussed above, a high reconstruction error indicates an anomaly. As illustrated in FIG. 8, the method 400 successfully learned the seasonal variation in the data over a 24 hour period and over different days of the week, and thus did not identify anomalies in the reduced number of active users over night or on certain days of the week. A high reconstruction error can be seen for data on the evening of September $24^{th}$ and it has been confirmed that this corresponds to an event at an arena in this area at this time, the event resulting in an abnormally high number of users in the area for the day and time in question.

Figure 9:
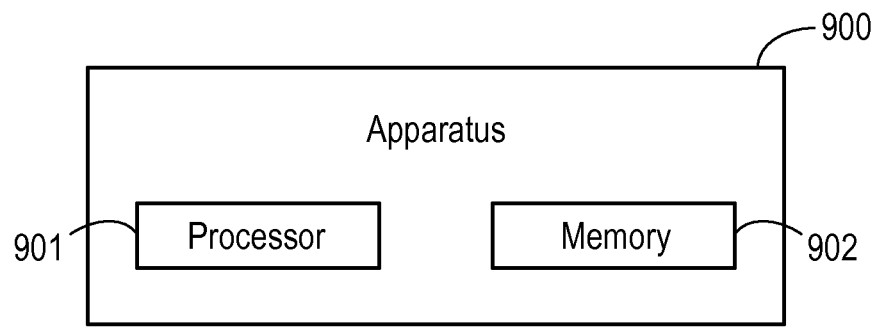
FIG. 9 is a block diagram illustrating functional elements in an apparatus for analysing performance of a telecommunications network.

The methods of the present disclosure may be conducted in an apparatus for analysing performance of a telecommunications network. FIG. 9 illustrates an example apparatus 900 which may implement the methods 100, 400 for example on receipt of suitable instructions from a computer program. Referring to FIG. 9, the apparatus 900 comprises a processor 901 and a memory 902. The memory 902 contains instructions executable by the processor 901 such that the apparatus 900 is operative to conduct some or all of the steps of the methods 100 and/or 400.

Figure 10:
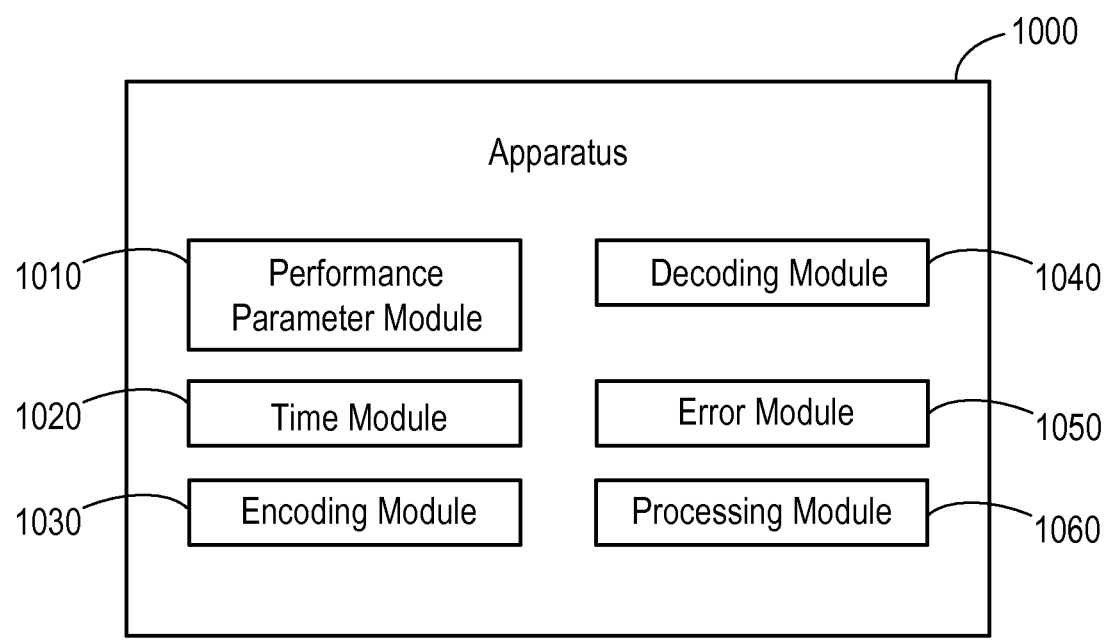
FIG. 10 is a block diagram illustrating functional elements in another example of apparatus for analysing performance of a telecommunications network.

FIG. 10 illustrates an alternative example apparatus 1000, which may implement the methods 100, 400, for example on receipt of suitable instructions from a computer program. It will be appreciated that the units illustrated in FIG. 10 may be realised in any appropriate combination of hardware and/or software. For example, the units may comprise one or more processors and one or more memories containing instructions executable by the one or more processors. The units may be integrated to any degree.

Referring to FIG. 10, the apparatus 1000 comprises a performance parameter module 1010 for assembling values observed for a network performance parameter over a time window. The apparatus also comprises a time module 1020 for constructing a time series by associating each performance parameter value with a representation of a time at which the value was observed. The apparatus also comprises an encoding module 1030 for encoding the time series to generate a compressed representation of the time series, a decoding module 1040 for decoding the compressed representation of the time series to reconstruct the time series and an error module 1050 for calculating a reconstruction error between the time series and the reconstructed time series. The apparatus also comprises a processing module 1060 for analysing the reconstruction error to determine if the assembled performance parameter values indicate an anomalous behaviour during the time window.

Aspects of the present disclosure thus provide methods according to which values observed for network performance parameters may be assembled into a time series by associating the values with a representation of a time at which the values were observed. This time series is then encoded and decoded, for example using an autoencoder, and a reconstruction error is analysed to identify anomalous behaviour. By associating the parameter values with a representation of a time at which the values were observed, the element of time becomes an integral part of the series input to the encoding and decoding steps, so enabling the method to learn periodic variations in normal behaviour of the network as represented by the performance parameters. Such periodic variations may include variations over a 24 hour period, over a week and/or over a year. Analysis of the reconstruction error allows not only for detection of anomalous behaviour but also an indication of which performance parameter and/or combination of performance parameters is at the root of the anomalous behaviour, so providing useful intelligence for diagnosing and addressing the underlying problem causing the anomalous behaviour. In examples of the present disclosure, the methods may learn normal behaviour patterns of individual performance parameters and combinations of performance parameters so as to identify departure from this normal behaviour. The learning may be performed offline using historical data, or may be performed online, continuously updating normal behaviour patterns according to newly available data.

It will be appreciated that no expert domain knowledge or manual tuning is required in order to conduct the encoding, decoding and reconstruction error calculation steps of the methods of the present disclosure, or to refine the encoding and/or decoding parameters during a learning phase. Expert domain knowledge is also not required to establish normal behavior profiles, for example through the setting of thresholds, or to enable the methods of the present disclosure to handle seasonal variation in normal network behaviour. The methods of the present disclosure may thus learn complex network behaviour patterns with no involvement of domain experts or manual tuning.

The methods may easily handle multiple network performance parameters and identify abnormal combinations of such parameters, in addition to abnormal behaviour of an individual parameter. The methods may further update the learned normal network behaviour patterns in real time, owing to the possibility for continuous online learning.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for analysing performance of a telecommunications network, the method comprising:
   assembling values observed for a network performance parameter over a time window;
   constructing a time series by associating each performance parameter value with a representation of a time at which the value was observed;
   encoding the time series to generate a compressed representation of the time series;
   decoding the compressed representation of the time series to reconstruct the time series;
   calculating a reconstruction error between the time series and the reconstructed time series; and
   analysing the reconstruction error to determine if the assembled performance parameter values indicate an anomalous behaviour during the time window.

2. A computer program product comprising non transitory computer readable media having stored thereon a computer program comprising instructions which, when executed on at least one processor, cause the at least one processor to:
   assemble values observed for a network performance parameter over a time window;
   construct a time series by associating each performance parameter value with a representation of a time at which the value was observed;
   encode the time series to generate a compressed representation of the time series;
   decode the compressed representation of the time series to reconstruct the time series;
   calculate a reconstruction error between the time series and the reconstructed time series; and
   analyse the reconstruction error to determine if the assembled performance parameter values indicate an anomalous behaviour during the time window.

3. An apparatus for analysing performance of a telecommunications network, the apparatus comprising a processor and a memory, the memory containing instructions executable by the processor such that the apparatus is operative to:
   assemble values observed for a network performance parameter over a time window;
   construct a time series by associating each performance parameter value with a representation of a time at which the value was observed;
   encode the time series to generate a compressed representation of the time series;
   decode the compressed representation of the time series to reconstruct the time series;
   calculate a reconstruction error between the time series and the reconstructed time series; and
   analyse the reconstruction error to determine if the assembled performance parameter values indicate an anomalous behaviour during the time window.

4. The apparatus as claimed in claim 3, wherein the memory contains instructions executable by the processor whereby the apparatus is further operative to associate the performance parameter value with the representation of the time at which the value was observed by:
   establishing a time at which the performance parameter value was observed;
   converting the time into a representation of the time in which the representation of the time follows consecutively from a representation of a time for an immediately preceding observed value; and
   associating the representation of the time with the performance parameter value.

5. The apparatus as claimed in claim 4, wherein the memory contains instructions executable by the processor whereby the apparatus is further operative to convert the time into a representation of the time in which the representation of the time follows consecutively from a representation of a time for an immediately preceding observed value by:
   mapping the time to a location on a unit circle; and
   representing the time as coordinates of the mapped location on the unit circle.

6. The apparatus as claimed in claim 3, wherein the time at which the value was observed comprises both a time of day and a day of the week, and wherein the representation of the time at which the value was observed comprises a first element representing the time of day and a second element representing the day of the week.

7. The apparatus as claimed in claim 3, wherein the memory contains instructions executable by the processor whereby the apparatus is further operative to construct a time series by associating each performance parameter value with a representation of a time at which the value was observed by:
   constructing a vector comprising the value and the associated time representation.

8. The apparatus as claimed in claim 7, wherein the memory contains instructions executable by the processor whereby the apparatus is further operative to construct a time series by associating each performance parameter value with a representation of a time at which the value was observed by:
   constructing a matrix comprising vectors for each of the performance parameter values observed within the time window.

9. The apparatus as claimed in claim 3, wherein the steps of encoding the time series to generate a compressed representation of the time series, decoding the compressed representation of the time series to reconstruct the time series, and calculating a reconstruction error between the time series and the reconstructed time series are performed by an Artificial Neural Network, ANN.

10. The apparatus as claimed in claim 3, wherein the memory contains instructions executable by the processor whereby the apparatus is further operative to calculate a reconstruction error between the time series and the reconstructed time series by:
    calculating a difference between an observed value and a reconstructed value for each value of the performance parameter in the time series; and
    calculating a mean value of the differences over the time window.

11. The apparatus as claimed in claim 10, wherein the memory contains instructions executable by the processor whereby the apparatus is further operative to calculate a reconstruction error between the time series and the reconstructed time series by:
    generating an anomaly metric by normalising the calculated mean value.

12. The apparatus as claimed in claim 10, wherein the memory contains instructions executable by the processor whereby the apparatus is further operative to calculate a reconstruction error between the time series and the reconstructed time series by:
    calculating a difference between an original value and a reconstructed value for each value of the representation of a time in the time series; and
    calculating a mean value of the differences over the time window.

13. The apparatus as claimed in claim 3, wherein the memory contains instructions executable by the processor whereby the apparatus, during a learning phase, is further operative to:
  repeat the steps of encoding the time series to generate a compressed representation of the time series, decoding the compressed representation of the time series to reconstruct the time series, and calculating a reconstruction error between the time series and the reconstructed time series; and
  between each repetition of the steps, refine parameters used in the decoding step to minimise the calculated reconstruction error.

14. The apparatus as claimed in claim 13, wherein the memory contains instructions executable by the processor whereby the apparatus is further operative to:
  repeat the steps of encoding the time series to generate a compressed representation of the time series, decoding the compressed representation of the time series to reconstruct the time series, and calculating a reconstruction error between the time series and the reconstructed time series until a threshold error magnitude is reached.

15. The apparatus as claimed in claim 3, wherein the memory contains instructions executable by the processor whereby the apparatus is further operative to:
  establish a profile of the reconstruction error representing normal behaviour of the performance parameter.

16. The apparatus as claimed in claim 15, wherein the memory contains instructions executable by the processor whereby the apparatus is further operative to establish a profile of the reconstruction error representing normal behaviour of the performance parameter by conducting a statistical analysis of the reconstruction error and defining a threshold distance from a mean value of the reconstruction error, the threshold distance delineating the profile representing normal behaviour of the performance parameter.

17. The apparatus as claimed in claim 3, wherein the memory contains instructions executable by the processor whereby the apparatus is further operative to analyse the reconstruction error to determine if the assembled performance parameter values indicate an anomalous behaviour during the time window by:
  comparing the calculated reconstruction error to an established profile for normal behaviour of the performance parameter; and
  identifying an anomalous behaviour if the calculated reconstruction error is outside the profile for normal behaviour.

18. The apparatus as claimed in claim 3, wherein the memory contains instructions executable by the processor whereby the apparatus is further operative to assemble values observed for a plurality of network performance parameters over a time window.

19. The apparatus as claimed in claim 18, wherein the memory contains instructions executable by the processor whereby the apparatus is further operative to construct a time series by associating each performance parameter value with a representation of a time at which the value was observed by, for each representation of a time, associating a value of each of the performance parameters observed at the represented time;
  wherein calculating a reconstruction error between the time series and the reconstructed time series comprises:
    calculating individual reconstruction errors for each performance parameter; and
    calculating a combined reconstruction error for all performance parameters.

20. The apparatus as claimed in claim 19, wherein the memory contains instructions executable by the processor whereby the apparatus is further operative to analyse the reconstruction error to determine if the assembled performance parameter values indicate an anomalous behaviour during the time window by:
  comparing the calculated combined reconstruction error to an established profile for normal behaviour of the combined performance parameters; and
  identifying an anomalous behaviour if the calculated combined reconstruction error is outside the profile for normal behaviour.

* * * * *